United States Patent
VanWart et al.

(10) Patent No.: US 10,348,834 B2
(45) Date of Patent: Jul. 9, 2019

(54) SELF CONFIGURING SMART PROBE

(71) Applicant: GrayWolf Sensing Solutions, LLC, Shelton, CT (US)

(72) Inventors: William F. VanWart, Austin, TX (US); Richard T. Stonier, Shelton, CT (US); John Coffey, Annacotty (IE)

(73) Assignee: GRAYWOLF SENSING SOLUTIONS, LLC, Shelton, CT (US)

(*) Notice: Subject to any disclaimer, the term of this patent is extended or adjusted under 35 U.S.C. 154(b) by 0 days.

(21) Appl. No.: 15/788,144

(22) Filed: Oct. 19, 2017

(65) Prior Publication Data

US 2018/0115610 A1 Apr. 26, 2018

Related U.S. Application Data

(60) Provisional application No. 62/412,142, filed on Oct. 24, 2016.

(51) Int. Cl.
| | | |
|---|---|---|
| *H04L 29/08* | (2006.01) | |
| *H04L 12/24* | (2006.01) | |
| *H04Q 9/00* | (2006.01) | |
| *H04L 12/26* | (2006.01) | |
| *H04L 12/40* | (2006.01) | |

(52) U.S. Cl.
CPC .............. *H04L 67/12* (2013.01); *H04L 12/40* (2013.01); *H04L 41/0813* (2013.01); *H04L 41/0816* (2013.01); *H04L 41/0853* (2013.01); *H04L 43/08* (2013.01); *H04Q 9/00* (2013.01); *H04L 41/0873* (2013.01); *H04L 41/0886* (2013.01); *H04L 2012/40208* (2013.01); *H04Q 2213/13204* (2013.01)

(58) Field of Classification Search
CPC . H04L 41/0813; H04L 41/0853; H04L 43/08; H04L 12/40; H04L 41/0816; H04L 67/12; H04L 41/0873; H04L 41/0886; H04Q 9/00; H04Q 2213/13204
See application file for complete search history.

(56) References Cited

U.S. PATENT DOCUMENTS

| | | | |
|---|---|---|---|
| 6,225,633 B1 | 5/2001 | Sun et al. | |
| 6,313,638 B1 | 11/2001 | Sun et al. | |
| 6,320,388 B1 | 11/2001 | Sun et al. | |
| 6,333,632 B1 | 12/2001 | Yang et al. | |
| 2004/0004559 A1* | 1/2004 | Rast | G02B 27/017 341/34 |
| 2008/0092624 A1 | 4/2008 | Scheffler | |
| 2009/0115423 A1 | 5/2009 | Stockdale et al. | |
| 2011/0252869 A1 | 10/2011 | Kilps et al. | |
| 2014/0097853 A1 | 4/2014 | Soundarrajan et al. | |
| 2014/0308661 A1* | 10/2014 | Holmes | G01N 35/00 435/6.1 |
| 2016/0301248 A1* | 10/2016 | Wester | G05F 5/00 |
| 2017/0038401 A1* | 2/2017 | Holmes | G01N 35/026 |
| 2018/0027632 A1* | 1/2018 | Roquemore, III | H05B 33/0842 315/307 |

* cited by examiner

*Primary Examiner* — Brian D Nguyen
(74) *Attorney, Agent, or Firm* — Ziegler IP Law Group, LLC

(57) ABSTRACT

A smart environmental sensing probe includes a communication path, a controller connected to the communication path, and one or more smart sensors, each with at least one common electrical interface for exchanging sensor information with the controller over the communication path using a common communication protocol.

18 Claims, 3 Drawing Sheets

SELF CONFIGURING SMART PROBE

This application claims the benefit of U.S. Provisional Application No. 62/412,142, filed on 24 Oct. 2016, incorporated by reference in its entirety.

FIELD

The disclosed exemplary embodiments are directed to environmental probes and sensors, and in particular, to a self-configuring smart probe with smart sensors.

BACKGROUND

Environmental instrumentation today provides for measurement of a variety of different parameters. The parameters that are measured may include volatile organic compounds, toxic gas, air velocity, carbon dioxide, particulates, percent relative humidity, differential pressure, ozone, ammonia and other parameters. Sensing these parameters is generally accomplished using probe assemblies having one or more sensors.

A typical probe assembly may include a PIC microcontroller based printed circuit board with multiple sensors mounted in sockets. Different sensors may have different analog or digital outputs, may require different scaling parameters and signal conditioning techniques, and are typically installed at the factory. Furthermore, the sensors may be configured via a combination of links soldered to or removed from the printed circuit board. The PIC microcontroller of the probe assembly may then be programmed for the installed sensors using a processor running a proprietary software program. As a result, probe assemblies have a rigid fixed configuration where sensors may only be changed out by factory personnel and the reconfigured probe may only be programmed while connected to a factory base unit running the proprietary software program. Factory reprogramming may also be required in order to change scaling parameters and for updating signal conditioning techniques.

Different sensors may have different characteristics that may change as the sensor operates and cause inaccurate readings. In addition, different sensing techniques may require different air flow velocities resulting in a return to the factory for additional reconfiguration.

It would be advantageous to provide an end user with the ability to install different sensors in a probe and have the probe automatically reconfigure itself to accommodate different sensors, sensor parameters, and signal conditioning techniques.

SUMMARY

As described herein, the exemplary embodiments overcome one or more of the above or other disadvantages known in the art.

The disclosed embodiments are directed to a smart environmental sensing probe that is capable of being reconfigured by changing one or more smart environmental sensors that each store operational parameters specific to on board sensor devices.

In at least one aspect, the disclose embodiments are directed to a smart environmental sensing probe, including a communication path, a controller connected to the communication path, and one or more smart sensors, each with at least one common electrical interface for exchanging sensor information with the controller over the communication path using a common communication protocol.

The communication path may be an $I^2C$ bus and the common communication protocol may be an $I^2C$ communication protocol.

The controller may include a microcontroller and a memory storing program instructions for operating the microcontroller to cause the controller to establish communication with each of the one or more smart sensors, and request configuration information from each of the one or more smart sensors.

The memory may include program instructions for operating the microcontroller to cause the controller to upload additional or revised configuration information to the one or more smart sensors based on the configuration information.

The memory may also include program instructions for operating the microcontroller to cause the controller to initialize a stabilization time for each smart sensor based on the configuration information.

The memory may further include program instructions for operating the microcontroller to cause the controller to read sensor information from the at least one common electrical interface of each of the one or more smart sensors.

The memory may still further include program instructions for operating the microcontroller to cause the controller to transmit the sensor data through the communication interface to one or more devices separate from the smart environmental sensing probe.

The one or more devices separate from the smart environmental sensing probe may include at least one of a user interface, a separate control device, a remote server, or a cloud service.

The smart environmental sensing probe may include a communication interface, and the microcontroller may cause the controller to store the sensor data until one or more devices separate from the smart environmental sensing probe are available to communicate through the communication interface.

In at least one other aspect, the disclosed embodiments are directed to a method of measuring environmental parameters, including installing one or more smart sensors in a smart environmental sensing probe, and connecting one or more common electrical interfaces of each smart sensor to a common communication path that implements a common communication protocol.

The communication path may be an $I^2C$ bus and the common communication protocol may be an $I^2C$ communication protocol.

The method may include establishing communication between a controller of the smart environmental sensing probe and each of the one or more smart sensors; and requesting, by the controller, configuration information from each of the one or more smart sensors.

The method may include using the controller to upload additional or revised configuration information to the one or more smart sensors based on the configuration information.

The method may also include using the controller to initialize a stabilization time for each smart sensor based on the configuration information.

The method may further include using the controller to read sensor information from the at least one common electrical interface of each of the one or more smart sensors.

The method may still further include using the controller to the controller to transmit the sensor data through a communication interface to one or more devices separate from the smart environmental sensing probe.

The one or more devices separate from the smart environmental sensing probe may include at least one of a user interface, a separate control device, a remote server, or a cloud service.

The method may include using the controller to store the sensor data until one or more devices separate from the smart environmental sensing probe are available to communicate through a communication interface.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DETAILED DESCRIPTION

Figure 1A:
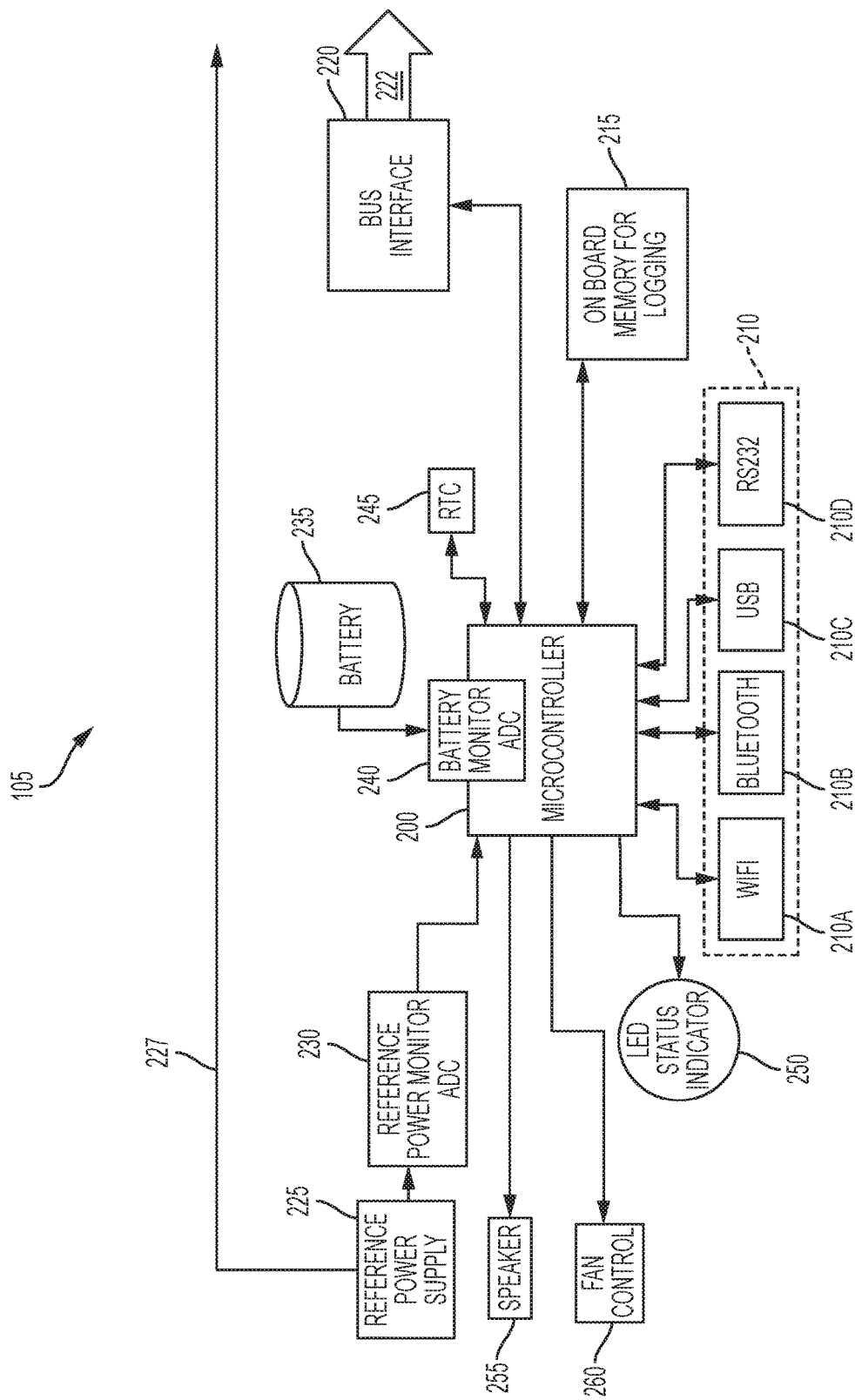
FIGS. 1A and 1B depict a schematic illustration of an exemplary smart environmental sensing probe according to the disclosed embodiments.
Figure 1B:
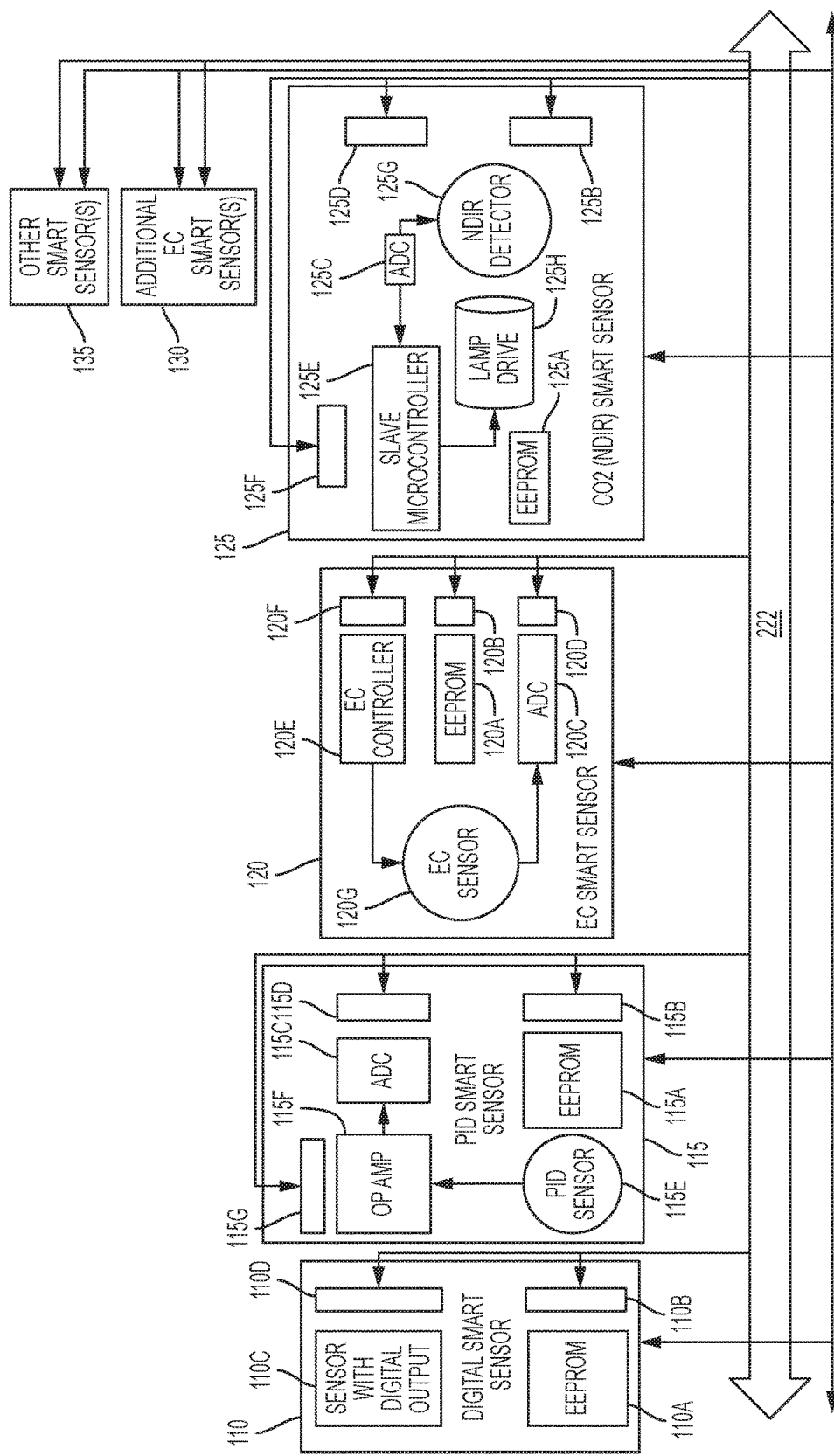

FIGS. 1A and 1B show a schematic illustration of an exemplary smart environmental sensing probe 100, referred to as a "smart probe," according to the disclosed embodiments. The smart probe 100 includes at least one exemplary smart probe controller 105 and one or more exemplary smart environmental sensors 110, 115, 120, 125, 130, 135, referred to as "smart sensors." The exemplary smart probe 100 may have one exemplary smart probe controller and seven exemplary smart sensors in any combination, however the number of smart probe controllers and smart sensors is not so limited and the smart probe may include any suitable number of smart probe controllers and smart sensors.

The smart probe controller 105 may include a microcontroller 200, one or more communication interfaces 210, a memory 215, a bus interface 220, a reference power supply 225, a reference power supply monitor 230, a power source 235, a power source monitor 240, a real time clock reference 245, a status indicator 250, an audio output 255, and a fan control 260.

The microcontroller 200 may be implemented using any suitable computing device, for example, a RISC based microcontroller with flash memory, non-volatile memory, internal registers, and a plurality of I/O lines. The microcontroller 200 may include an on-board memory that may store program instructions for operating the microcontroller 200 to cause the smart probe controller 105 to implement the disclosed embodiments and perform the operations disclosed herein.

The one or more communication interfaces 210 may include one or more of a WiFi (IEEE 802.11) wireless interface 210A, a Bluetooth (IEEE 802.15) wireless interface 210B, a Universal Serial Bus (USB) interface 210C, an RS 232 serial communication interface 210D, or any other communication interface suitable for transmitting, receiving, or exchanging data.

Figure 2:
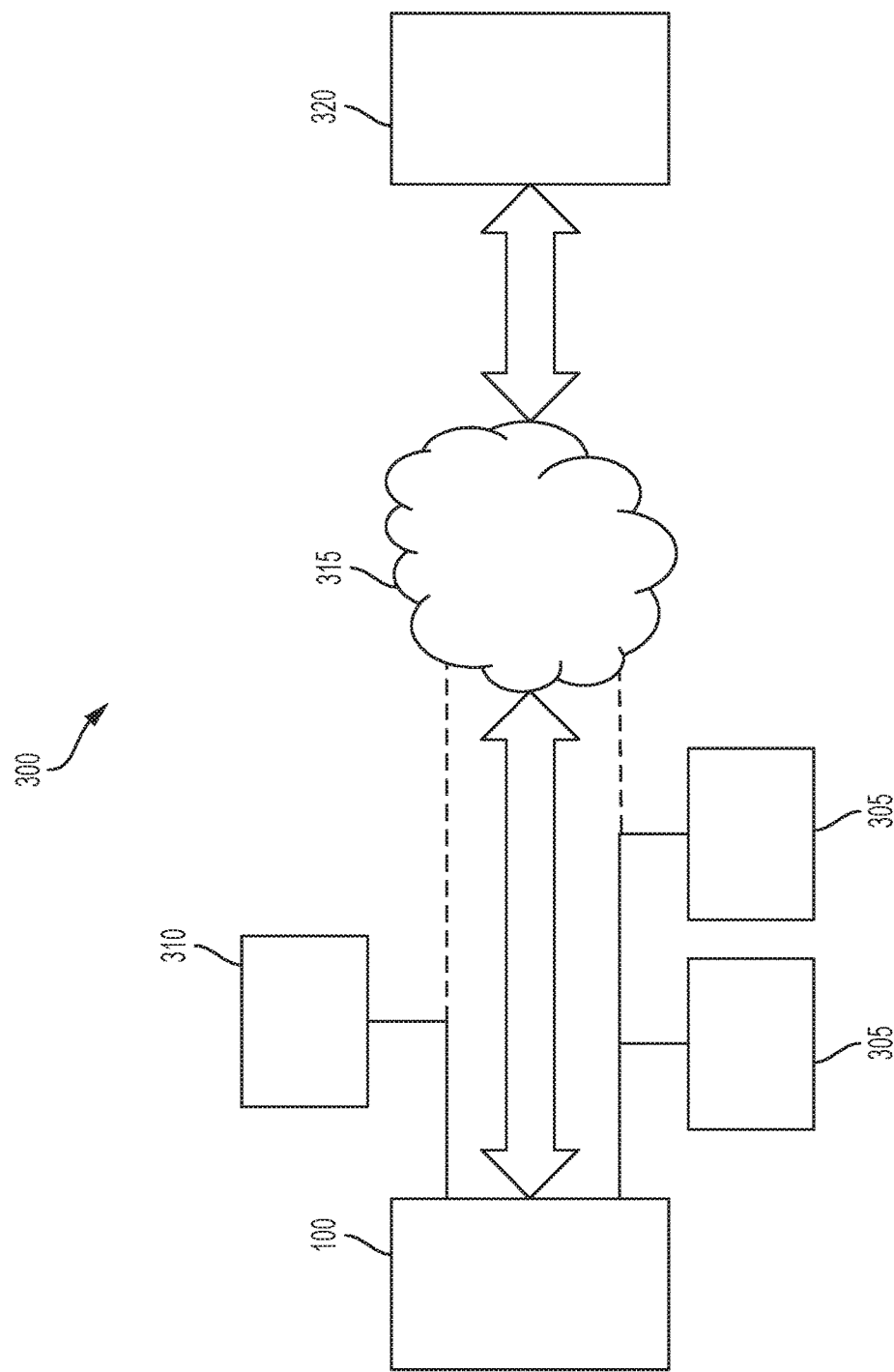
FIG. 2 shows a system in which the exemplary smart environmental sensing probe may operate.

Turning to FIG. 2, the one or more communication interfaces 210 may provide connections to one or more user interfaces 305 which may include input or output devices which may operate to allow input to the smart probe 100, or to provide output from the smart probe 100, for example, a display, respectively. The one or more communication interfaces 210 may also provide connections to one or more separate control devices 310 for sending commands, receiving data, and generally controlling the operations of the smart probe 100. In addition, the one or more communication interfaces 210 may provide an internet or other network connection 315 to a remote server or cloud service 320 that may provide programming, data, and other information to the smart probe 100. In one or more embodiments, the remote server or cloud service may provide programs, parameters and other data for configuring the smart sensors 110, 115, 120, 125, 130, 135.

Returning to FIG. 1A, the memory 215 may include magnetic media, semiconductor media, optical media, or any media which is readable by the microcontroller 200. The memory 215 may store configuration data for the smart sensors 110, 115, 120, 125, 130, 135, smart sensor readings from the smart sensors 110, 115, 120, 125, 130, 135, and any other suitable data.

The bus interface 220 may include circuitry for providing a communication path 222 between the smart probe controller 105 and the smart sensors 110, 115, 120, 125, 130, 135 (FIG. 1B). For example, the bus interface 220 may be implemented as an Inter-Integrated Circuit ($I^2C$) bus switch interfacing with a two wire bus and utilizing the $I^2C$ protocol for effecting the communication path 222 as an $I^2C$ bus between the smart probe controller 105 as a master and the smart sensors 110, 115, 120, 125, 130, 135 as slave devices.

The reference power supply 225 operates to provide a precise voltage reference signal 227 to the smart sensors 110, 115, 120, 125, 130, 135 and may be implemented as a series, shunt, or other suitable voltage regulator that provides initial accuracy, acceptable drift and long term stability characteristics.

The reference power supply monitor 230 may be an analog to digital converter (ADC) having a suitable bandwidth and signal to noise ratio that operates to provide the microcontroller with a digital representation of the voltage output of the reference power supply 225 for identifying deviations that may affect system performance. The microcontroller 200 may operate to monitor the output of the reference power supply 225 through the reference power supply monitor 230 to effect a self-monitoring power supply. In some embodiments, in response to the output of the reference power supply monitor, the microcontroller may optionally control the output of the reference power supply to maintain the output at a specified level. If the output signal 227 of the reference power supply 225 is outside specifications and corrections cannot be made, the microcontroller 200 may stop some operations and issue an alert through one or more of the communication interfaces 210A-210D and may indicate a fault on the status indicator 250, described below.

The power source 235 may include any suitable power source for providing power to the smart probe controller 105 and other components comprising the smart probe 100. In some exemplary embodiments, the power source 235 may be implemented using a battery or other stand-alone power source. In embodiments using a battery, the battery may be rechargeable. In at least one embodiment, the power source may include a power converter connected to a mains supply. In one or more embodiments the power source 235 may be located externally or remote from the smart probe controller 105 or from the smart probe 100 and may provide power to the smart probe controller 10 through a wired or wireless connection. The power source located externally or remotely may be for example, an AC-DC converter connected to a mains supply. The power source 235 may also provide power to each of the exemplary smart sensors 110, 115, 120, 125, 130, 135 in order to stabilize sensing devices or circuitry that may be part of the smart sensors.

The power source monitor 240 may include circuitry for providing the microcontroller with a record of the output and status of the power source 235 for identifying deviations that may signal power failures, end of power source life, or other power problems. The power source monitor 240 circuitry may include an ADC similar to the reference power supply monitor 230 and a memory with support circuitry for storing records of the output and status of the power source 235.

The real time clock 245 includes time keeping circuitry and an independent power source in order to provide the microcontroller 200 with a persistent time indication that may include, for example, the current year, month, day, hour, second, and fraction of the present second. The real time clock 245 may be implemented as a separate integrated circuit and the independent power source may be a battery or super-capacitor.

The smart probe controller 205 may also include a status indicator 250 in the form of a multistate LED controlled by the microcontroller 200 to provide a visual indicator of various operating conditions, error conditions, data communications, or other events occurring within or sensed by the smart probe 100.

An audio output 255 device may be implemented as a piezo-electric device or other audio generator also controlled by the microcontroller to provide an audio indication of events occurring within or sensed by the smart probe 100.

The smart probe 100 may also include a fan controlled by fan control 260, which in turn is controlled by the microcontroller 200. The fan control 260 may be a switch that provides or interrupts power to the fan, or a variable controller that provides a selectable amount of power as determined by the microcontroller 200.

The smart probe controller is capable of at least two modes of data collection, including receiving data from the smart sensors and transmitting the data through the communication interface 210 to a receiving device, for example, one or more of the user interfaces 305, separate control devices 310, or the remote server or cloud service 320, or alternately, storing the data from the smart sensors until a data connection is available.

The sensors 110, 115, 120, 125, 130, 135 are usable among any number of smart probes. Each smart sensor 110, 115, 120, 125, 130, 135 has at least one common electrical interface, for example, an $I^2C$ interface, to communication path 222, for connecting to the smart probe controller 105, and includes at least a memory and one or more of a sensing device, an ADC, or a slave microcontroller, all directly addressable through their own electrical interface to communication path 222. The memory stores at least a smart sensor identifier specific to the particular smart sensor, a last power up time and date, and a smart probe identifier specific to a smart probe in which the smart sensor was previously installed. Other parameters may be stored in the memory. Each smart sensor provides a digital output directly from a sensing device, or couples the sensing device to an ADC in a manner that minimizes all analog circuit lengths. Each smart sensor may have additional common electrical interfaces, additional sensing devices, and other components, and each memory may store additional information, depending on a particular smart sensor application. Upon power up on site, the smart probe controller 105 operates to read the memory on each smart sensor and utilize the read information to program the smart sensor or to process data from the smart sensor.

The smart sensors may include one or more digital smart sensors 110, Photo-Ionization Detector (PID) smart sensors 115, A and B type Electro-Chemical (EC) smart sensors 120, 130, $CO_2$ Non-Dispersive Infra-Red (NDIR) smart sensors 125, and other smart sensors 135 such as environmental smart sensors that may measure relative humidity, temperature, or barometric pressure, light, radiation, sound, combustible gas or solvent sensors, referred to as Lower Explosive Limit (LEL) sensors, and any other suitable environmental parameters. Non-limiting examples of each of the smart sensors are described below.

The exemplary digital smart sensor 110 may include a memory 110A with an electrical interface 110B to communication path 222 and a sensing device 110C with an electrical interface 110D to communication path 222. The electrical interfaces 110B, 110D may be integral to the memory 110A and sensing device 110C, respectively, or may be implemented using additional circuitry. The electrical interfaces 110B, 110D are common in that they share the same signals as the communication path 222 and communicate with the smart probe controller 105 using a common communication protocol. In some embodiments, the communication path 222 may be an $I^2C$ bus and the communication protocol is an $I^2C$ protocol. In addition to a digital smart sensor identifier, the last power up time and date, and the previous smart probe in which the smart sensor was previously installed, the memory 110A may store amplification parameters, scaling factors, polling frequencies, sensor sampling rates, and any other parameters that may be utilized for conditioning and stabilizing the digital smart sensor 110 itself and the sensing device 110C, and for conditioning each type of data sent by the sensing device 110C.

The PID smart sensor 115 may include a memory 115A with an electrical interface 115B to communication path 222 and an ADC 115C with an electrical interface 115D to communication path 222. The electrical interfaces 115B, 115D may be integral to the memory 115A and ADC 115C, respectively, or may be implemented using additional circuitry. The PID smart sensor 115 may also include a PID sensing device 115E and an amplifier 115F for conditioning the output of the PID sensing device 115E and providing the conditioned output to the ADC 115C. In some embodiments, the amplifier 115F may also have an electrical interface 115G, which may be integral to the amplifier 115F or may be separate. Similar to the electrical interfaces 1106, 110D, the electrical interfaces 115B, 115D, 115G are common in that they share the same signals as the communication path 222 and communicate with the smart probe controller 105 using a common communication protocol, which in some embodiments may be an $I^2C$ communication protocol where the communication path 222 may be an $I^2C$ bus. In some embodiments, the smart probe controller 105 may access the PID smart sensor by addressing the memory 115A, the ADC 115C or the amplifier 115F. The smart probe controller 105 may optionally address the amplifier 115F in order to program the amplifier 115F, set amplification parameters or thresholds or other parameters, or to read an output provided by the amplifier 115F. The smart probe controller 105 may address the PID ADC 115C to set amplification parameters or thresholds or other parameters read conditioned data from the PID sensing device 115E.

The memory may store a PID smart sensor identifier, the last power up time and date, amplifier and ADC amplification parameters, scaling factors, polling frequencies, averaging intervals, ADC sampling rates, and any other parameters that may be utilized for conditioning each type of data sent by the PID sensing device 115E.

The EC smart sensor 120 may be an A or B size EC smart sensor and may include a memory 120A with an electrical interface 120B to communication path 222 and an ADC 120C with an electrical interface 120D to communication path 222. The electrical interfaces 120B, 120D may be common electrical interfaces as defined above, and may be integral to the memory 120A and ADC 120C, respectively, or may be implemented using additional circuitry. The EC smart sensor 120 may also include an EC controller 120E with an integral or separate common electrical interface 120F as defined above to communication path 222. In one or more embodiments, the common electrical interfaces 120B, 120D, 120F may be I$^2$C interfaces and the communication path 222 may be an I$^2$C bus. In addition, the EC smart sensor 120 may include an EC sensing device 120G. The memory 120A, electrical interface 120B, ADC 1120C, electrical interface 120D, EC controller 120E, electrical interface 120F, and EC sensing device 120G may be implemented as a single integrated circuit or may be implemented as separately packaged circuits. In addition to an EC smart sensor identifier and the last power up time and date, the memory 115A may store amplifier and ADC amplification parameters, scaling factors, polling frequencies, averaging intervals, ADC sampling rates, and any other parameters that may be utilized for conditioning each type of data sent by the EC sensing device 120G.

The EC controller 120E may operate to provide commands and settings to the EC sensing device 120G and the ADC 120C. In some embodiments, the smart probe controller 105 may access the EC smart sensor by addressing the memory 120A, the ADC 120C or EC controller 120E. The smart probe controller 105 may address the EC controller 120E in order to program the controller, set measurement or other parameters, or to read an output provided by the EC controller 120E. The smart probe controller 105 may address the EC ADC 120C to read conditioned data from the EC sensing device.

The CO2 NDIR smart sensor 125 may include a memory 125A with an electrical interface 125B to communication path 222 and an ADC 125C with an electrical interface 125D to communication path 222. The memory 120A and ADC 120C may have the electrical interfaces 125B and 125D incorporated as integral circuits or the electrical interfaces 125B and 125D may be implemented separately. The CO2 NDIR smart sensor 125 may also include a CO2 NDIR controller 125E with an integral or separate electrical interface 125F to communication path 222. In some embodiments, the electrical interfaces 125B, 125D, 125F may be common interfaces as defined above and may be I$^2$C interfaces. In addition, the CO2 NDIR smart sensor 125 may include an NDIR detector 125G and an infrared source 125H. The CO2 NDIR controller 125E may operate the infrared source 125H, collect NDIR data from the ADC 125C and provide the collected data to the smart probe controller 105 over the communication path 222 by way of the electrical interface 125F. In at least one embodiment, the communication path 222 may be an I$^2$C bus utilizing an I$^2$C communication protocol.

The smart probe controller 105 may address the CO$_2$ NDIR controller 125E in order to program the controller, set measurement or other parameters, or to read an output provided by the CO$_2$ NDIR controller 125E. The smart probe controller 105 may also address the CO$_2$ NDIR ADC 125C to read conditioned data from the NDIR sensing device 125G.

It should be understood that other smart sensors 130, 135 may be implemented within the smart probe 100 including, without limitation, other digital, PID, EC, and CO$_2$ NDIR smart sensors and any other types of smart sensors suitable for use in the smart probe 100.

The smart probe 100 may be set up during factory assembly. For example, during assembly of the smart probe 100, configuration information for all or a subset of smart sensors may be downloaded to memory 215 and to memories 110A, 115A, 120A, 125A, from a remote server or cloud service 320 (FIG. 2). In some embodiments, one or more smart sensors may be factory installed and configuration information is downloaded to memories 110A, 115A, 120A, 125A, as applicable, while pointers, reference data, or a subset of the configuration information may be downloaded to memory 215. In additional embodiments, one or more smart sensors may be configured individually, separate from the smart probe 100 for future installation.

After factory set up, the smart probe 100 may be shipped or otherwise transported to an on-site location for use. In some exemplary on-site installations, one or more smart sensors may be installed in the smart probe at the on-site location. Upon on site power up, the smart probe controller 105 initializes the communication interface 210, and provides power to each of the installed smart sensors, which may be all or a subset of smart sensors 110, 115, 120, 125, 130, 135. The installed smart sensors initialize and the smart probe controller 105 establishes communication with each of the installed smart sensors over the communication path 222 through their common electrical interfaces. The smart probe controller 105 requests configuration information from each of the installed smart sensors, for example, the type of sensor, ADC parameters if present, parameters stored in memory, or any suitable configuration information In some embodiments, the smart probe controller 105 may load the memories of the installed smart sensors with additional or revised configuration information, for example, amplification parameters, scaling factors, polling frequencies, sensor sampling rates, signal conditioning techniques, or any other suitable parameters. The smart probe controller 105 may initiate a stabilization time for each of the installed smart sensors based on configuration information stored in the individual smart sensor memories, for example, one or more of the smart sensor specific identifier, the smart probe identifier specific to a smart probe in which the smart sensor was previously installed, the parameters stored in the memories of the installed smart sensors, and information from the power source monitor 240, the real time clock 245 and the reference power supply monitor 225. The smart probe 100 may then proceed to read data from the installed smart sensors by reading the digital sensing devices common interfaces, reading the common interfaces of the memories of the installed smart sensors, reading the common interfaces of the ADC's of the installed smart sensors, or reading data from the common interfaces of the individual installed smart sensor controllers if so configured.

As mentioned above, the smart probe 100 may then receive data from the smart sensors and transmit the data through the communication interface 210 to one or more devices separate from the smart probe 100, for example, one or more of the user interfaces 305, separate control devices 310, or the remote server or cloud service 320. In the alternative, the smart probe 100 may store the data from the smart sensors until a data connection is available.

Various modifications and adaptations may become apparent to those skilled in the relevant arts in view of the foregoing description, when read in conjunction with the accompanying drawings. However, all such and similar modifications of the teachings of the disclosed embodiments will still fall within the scope of the disclosed embodiments.

Various features of the different embodiments described herein are interchangeable, one with the other. The various described features, as well as any known equivalents can be mixed and matched to construct additional embodiments and techniques in accordance with the principles of this disclosure.

Furthermore, some of the features of the exemplary embodiments could be used to advantage without the corresponding use of other features. As such, the foregoing description should be considered as merely illustrative of the principles of the disclosed embodiments and not in limitation thereof.

The invention claimed is:

1. A smart environmental sensing probe, comprising:
a communication path;
a controller connected to the communication path; and
one or more smart sensors, each comprising:
at least one common electrical interface for exchanging sensor information with the controller over the communication path using a common communication protocol; and
a memory for storing:
operational parameters of a sensing device of the smart sensor for conditioning the sensing device, initializing a stabilization time for the sensing device, and for conditioning data sent by the sensing device based on configuration information.

2. The smart environmental sensing probe of claim 1, wherein the controller comprises a microcontroller and a memory storing program instructions for operating the microcontroller to cause the controller to:
establish communication with each of the one or more smart sensors; and
request configuration information from each of the one or more smart sensors.

3. A smart environmental sensing probe, comprising:
a communication path;
a controller connected to the communication path;
one or more smart sensors, each with at least one common electrical interface for exchanging sensor information with the controller over the communication path using a common communication protocol;
a microcontroller and a memory storing program instructions for operating the microcontroller to cause the controller to:
establish communication with each of the one or more smart sensors;
request configuration information from each of the one or more smart sensors; and,
initialize a stabilization time for each smart sensor based on the configuration information.

4. The smart environmental sensing probe of claim 3, wherein the communication path is an I2C bus and the common communication protocol is an I2C communication protocol.

5. The smart environmental sensing probe of claim 3, wherein the memory includes program instructions for operating the microcontroller to cause the controller to upload additional or revised configuration information to the one or more smart sensors based on the configuration information.

6. The smart environmental sensing probe of claim 3, wherein the memory includes program instructions for operating the microcontroller to cause the controller to read sensor information from the at least one common electrical interface of each of the one or more smart sensors.

7. The smart environmental sensing probe of claim 6, further comprising a communication interface, wherein the memory includes program instructions for operating the microcontroller to cause the controller to transmit the sensor information through the communication interface to one or more devices separate from the smart environmental sensing probe.

8. The smart environmental sensing probe of claim 7, wherein the one or more devices separate from the smart environmental sensing probe comprise at least one of a user interface, a separate control device, a remote server, or a cloud service.

9. The smart environmental sensing probe of claim 6, further comprising a communication interface, wherein the memory includes program instructions for operating the microcontroller to cause the controller to store the sensor information until one or more devices separate from the smart environmental sensing probe are available to communicate through the communication interface.

10. A method of measuring environmental parameters, comprising:
installing one or more smart sensors in a smart environmental sensing probe; and
connecting one or more common electrical interfaces of each smart sensor to a common communication path that implements a common communication protocol; and
storing within a memory of each of the one or more smart sensors, operational parameters of a sensing device of the smart sensor for conditioning the sensing device, initializing a stabilization time for the sensing device, and for conditioning data sent by the sensing device based on configuration information.

11. The method of measuring environmental parameters of claim 10, comprising:
establishing communication between a controller of the smart environmental sensing probe and each of the one or more smart sensors; and
requesting, by the controller, configuration information from each of the one or more smart sensors.

12. A method of measuring environmental parameters, comprising:
installing one or more smart sensors in a smart environmental sensing probe;
connecting one or more common electrical interfaces of each smart sensor to a common communication path that implements a common communication protocol;
establishing communication between a controller of the smart environmental sensing probe and each of the one or more smart sensors;
requesting, by the controller, configuration information from each of the one or more smart sensors; and using the controller to initialize a stabilization time for each smart sensor based on the configuration information.

13. The method of measuring environmental parameters of claim 12, wherein the communication path is an I²C bus and the common communication protocol is an I²C communication protocol.

14. The method of measuring environmental parameters of claim 12, comprising using the controller to upload additional or revised configuration information to the one or more smart sensors based on the configuration information.

15. The method of measuring environmental parameters of claim 12, comprising using the controller to read sensor information from the at least one common electrical interface of each of the one or more smart sensors.

16. The method of measuring environmental parameters of claim 15, comprising using the controller to transmit the sensor information through a communication interface to one or more devices separate from the smart environmental sensing probe.

17. The method of measuring environmental parameters of claim 16, wherein the one or more devices separate from the smart environmental sensing probe comprise at least one of a user interface, a separate control device, a remote server, or a cloud service.

18. The method of measuring environmental parameters of claim 15, comprising using the controller to store the sensor information until one or more devices separate from the smart environmental sensing probe are available to communicate through a communication interface.

* * * * *